(12) United States Patent
Ozaki (10) Patent No.: US 12,512,500 B2
(45) Date of Patent: Dec. 30, 2025

(54) JIG

(71) Applicant: TOYOTA JIDOSHA KABUSHIKI KAISHA, Toyota (JP)

(72) Inventor: Takashi Ozaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 484 days.

(21) Appl. No.: 18/105,321

(22) Filed: Feb. 3, 2023

(65) Prior Publication Data

US 2023/0253607 A1 Aug. 10, 2023

(30) Foreign Application Priority Data

Feb. 7, 2022 (JP) .................................. 2022-017448

(51) Int. Cl.
*H01M 10/04* (2006.01)
(52) U.S. Cl.
CPC .............................. *H01M 10/0404* (2013.01)
(58) Field of Classification Search
CPC ......... H10M 10/0404; H10M 10/0468; H10M 10/0481; H10M 50/209; H10M 50/264; B25B 11/00; Y10T 29/49108; Y10T 29/53135; B65B 13/20; B65B 13/22; F16B 2/08
See application file for complete search history.

(56) References Cited

U.S. PATENT DOCUMENTS

| | | | |
|---|---|---|---|
| 6,197,446 B1 | 3/2001 | Fukuda et al. | |
| 9,985,322 B2 * | 5/2018 | Kado ................ | H01M 10/6571 |
| 10,263,276 B2 * | 4/2019 | Kobayashi .......... | H01M 50/264 |
| 2008/0318119 A1 * | 12/2008 | Watanabe ............... | B60L 50/64 |
| | | | 429/99 |
| 2010/0112424 A1 * | 5/2010 | Hayashi .............. | H01M 16/006 |
| | | | 429/99 |
| 2015/0147630 A1 * | 5/2015 | Nakano ................... | H01M 4/13 |
| | | | 429/188 |

FOREIGN PATENT DOCUMENTS

| | | | | |
|---|---|---|---|---|
| CN | 110034253 A | * | 7/2019 | ........ H01M 10/0481 |
| JP | 62-031942 A | | 2/1987 | |
| JP | H11-120963 A | | 4/1994 | |

OTHER PUBLICATIONS

CN-110034253-A translation from FIT database (Year: 2025).*

* cited by examiner

Primary Examiner — Jeffrey T Carley
Assistant Examiner — Joshua D Anderson
(74) Attorney, Agent, or Firm — Dinsmore & Shohl LLP (57) ABSTRACT

A jig may include a pair of press blocks configured to hold a stack of battery cells. A clamp is provided on the press block(s). The clamp is configured to position the band with respect to the stack. A hinge mechanism connects the clamp to the press block(s) such that the clamp is pivotable. A cam mechanism is provided on the hinge mechanism and configured to move the clamp along a pivot axis according to a pivot position of the clamp. When the clamp is at a use position, the band may be interposed between the clamp and the stack in a direction parallel to the pivot axis. The cam mechanism moves the clamp in a direction away from the stack while the clamp is moving from a retracted position to the use position and move the clamp toward the stack when the clamp reaches the use position.

8 Claims, 8 Drawing Sheets

JIG

CROSS-REFERENCE TO RELATED APPLICATION

This application claims priority to Japanese Patent Application No. 2022-017448, filed on Feb. 7, 2022, contents of which are incorporated herein by reference.

TECHNICAL FIELD

The technology disclosed herein relates to a jig, in particular, to a jig used for manufacture of a battery stack.

BACKGROUND

Japanese Patent Application Publication No. H11-120963 describes a battery stack. In the battery stack, a plurality of battery cells are stacked between a pair of end plates. The pair of end plates are connected to each other by a plurality of bands, and hold and compress the plurality of battery cells.

SUMMARY

In manufacture of a battery stack, first, a stack in which a plurality of battery cells are stacked between a pair of end plates is prepared. Then, bands are positioned with respect to the stack while the stack is compressed under a predetermined load, and the bands and the end plates are joined to each other. As a result, the pair of end plates are connected to each other via the bands. If the bands are displaced when the bands and the end plates are joined, they may not be joined with sufficient strength. The disclosure herein provides a technique for accurately positioning a band with respect to a stack of battery cells.

The disclosure herein discloses a jig for positioning a band that connects a pair of end plates to each other with respect to a stack in which a plurality of battery cells are stacked between the pair of end plates. The jig may comprise a pair of press blocks configured to hold and compress the stack along a stacking direction of the stack; a clamp provided on at least one press block, wherein the clamp is configured to position the band arranged along the stack held by the pair of press blocks with respect to the stack; a hinge mechanism connecting the clamp to the at least one press block such that the clamp is pivotable between a use position and a retracted position about a pivot axis perpendicular to the stacking direction; and a cam mechanism provided on the hinge mechanism and configured to move the clamp along the pivot axis according to a pivot position of the clamp. When the clamp is at the use position, the band may be interposed between the clamp and the stack in a direction parallel to the pivot axis. The cam mechanism may move the clamp in a direction away from the stack while the clamp is moving from the retracted position to the use position and move the clamp toward the stack when the clamp reaches the use position.

BRIEF DESCRIPTION OF DRAWINGS

In FIGS. 1 to 3, end plates 14 are hatched to clarify the configuration of the battery stack 20.

FIG. 5A corresponds to FIG. 4A and thus illustrates the state where the pivot angle of the hinge mechanism 40 is 180 degrees.

FIG. 5B corresponds to FIG. 4B and thus illustrates the state where the pivot angle of the hinge mechanism 40 is 90 degrees.

FIG. 5C corresponds to FIG. 4C and thus illustrates the state where the pivot angle of the hinge mechanism 40 is 0 degrees.

DETAILED DESCRIPTION

In an embodiment of the disclosure herein, a jig is for positioning a band that connects a pair of end plates to each other with respect to a stack in which a plurality of battery cells are stacked between the pair of end plates. The jig comprises a pair of press blocks configured to hold and compress the stack along a stacking direction of the stack; a clamp provided on at least one press block, wherein the clamp is configured to position the band arranged along the stack held by the pair of press blocks with respect to the stack; a hinge mechanism connecting the clamp to the at least one press block such that the clamp is pivotable between a use position and a retracted position about a pivot axis perpendicular to the stacking direction; and a cam mechanism provided on the hinge mechanism and configured to move the clamp along the pivot axis according to a pivot position of the clamp. When the clamp is at the use position, the band is interposed between the clamp and the stack in a direction parallel to the pivot axis. The cam mechanism moves the clamp in a direction away from the stack while the clamp is moving from the retracted position to the use position and move the clamp toward the stack when the clamp reaches the use position.

With the above-described jig, the stack including the pair of end plates and the plurality of battery cells is held and compressed by the pair of press blocks. At least one press block is provided with the clamp that positions the band arranged along the stack with respect to the stack. The clamp is connected to the at least one press block via the hinge mechanism and is configured to be pivotable between the use position and the retracted position. When the clamp pivots from the retracted position to the use position, the band is interposed between the clamp and the stack in the direction parallel to the pivot axis of the hinge mechanism. Thus, the band is positioned with respect to the stack.

The hinge mechanism is provided with the cam mechanism. The cam mechanism moves the clamp along the pivot axis according to the pivot position of the clamp. While moving from the retracted position to the use position, the clamp is moved by the cam mechanism in the direction away from the stack, and when reaching the use position, the clamp is moved toward the stack. Thus, while the clamp is pivoting toward the use position, the clamp does not come into contact with the band unnecessarily, which avoids unintended displacement of the band. Further, when the clamp reaches the use position, the clamp is moved toward the stack, so that the band is interposed between the clamp and the stack. At this time, the clamp is moved along the pivot axis of the hinge mechanism, and thus unintended displacement of the band is suppressed even when the clamp contacts the band.

In one embodiment of the disclosure herein, the clamp may comprise a contact surface that contacts the band at the use position. In this case, the contact surface may be located on the same side as the stack with respect to the at least one press block when the clamp is at the use position. The contact surface may be located on the opposite side to the stack with respect to the at least one press block when the clamp is at the retracted position. According to such a configuration, when the stack is to be placed in the jig, the clamp can be retracted to a position where the clamp does not hinder the placement of the stack.

In addition to the configuration of the clamp described above, the clamp may comprise the contact surface at one end thereof and be connected to the hinge mechanism at another end thereof. According to such a configuration, the contact surface of the clamp can be largely moved by the pivot of the clamp.

In one embodiment of the disclosure herein, the cam mechanism may comprise a pair of cam protrusions provided on the hinge mechanism and a biasing member biasing the clamp along the pivot axis. According to such a configuration, the pair of cam protrusions are constantly maintained in contact with each other by the biasing member. Accordingly, the clamp can be smoothly moved along the shape of the cam protrusions.

In addition to the configuration of the cam mechanism described above, the hinge mechanism may comprise a first shaft fixed on the at least one press block and a second shaft fixed on the clamp and arranged coaxially with the first shaft along the pivot axis. In this case, the pair of cam protrutions may be located between the first shaft and the second shaft, and the biasing member may be provided at one of the first shaft and the second shaft.

In one embodiment of the disclosure herein, the jig may further comprise an actuator configured to advance and retract one of the pair of press blocks toward and from the other of the pair of press blocks or advance and retract both of the pair of press blocks toward and from each other. Thus, the stack of the battery cells can be pressed by the actuator. The actuator may be, for example, an electric motor.

In one embodiment of the disclosure herein, the at least one press block may be supported by a plurality of elastic members arranged in parallel with each other. In this case, when the at least one press block contacts the stack, the at least one press block may change its orientation to follow a surface of the stack that the at least one press block is in contact with. According to such a configuration, the at least one press block can contact the stack over a wide area, and thus local load on the stack is suppressed.

In one embodiment of the disclosure herein, the jig may further comprise a positioning member configured to position the stack by contacting the stack located between the pair of press blocks in a direction perpendicular to the stacking direction. According to such a configuration, when the stack is to be set in the jig, the position of the stack in the direction perpendicular to the stacking direction of the stack can be determined by moving the stack toward the positioning member.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved jigs, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure.

Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

A jig 10 of an embodiment will be described with reference to the drawings. The jig 10 is used for manufacture of a battery stack 20. In the drawings of the disclosure herein, an x-axis positive direction is referred to as the right direction of left-right direction and an x-axis negative direction is referred to as the left direction of the left-right direction. Further, in the drawings, a y-axis positive direction is referred to as the rear direction of front-rear direction and a y-axis negative direction is referred to as the front direction of the front-rear direction. Then, in the drawings, a z-axis positive direction is referred to as the upward direction of up-down direction and a z-axis negative direction is referred to as the downward direction of the up-down direction.

Figure 1:
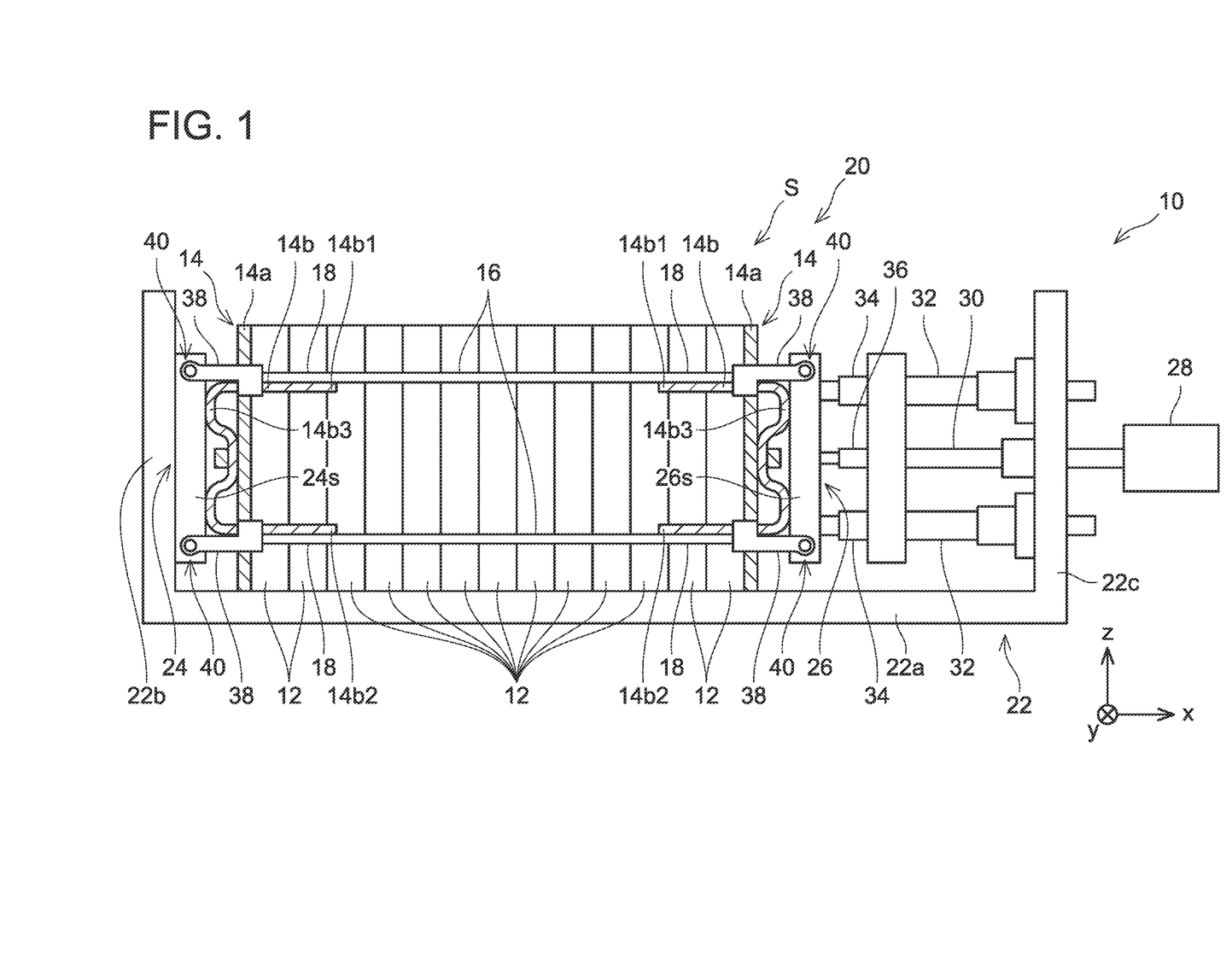
FIG. 1 is a front view schematically illustrating a jig 10 and a battery stack 20, in which a movable block 26 is at a compression position and clamps 38 are at a use position.
Figure 2:
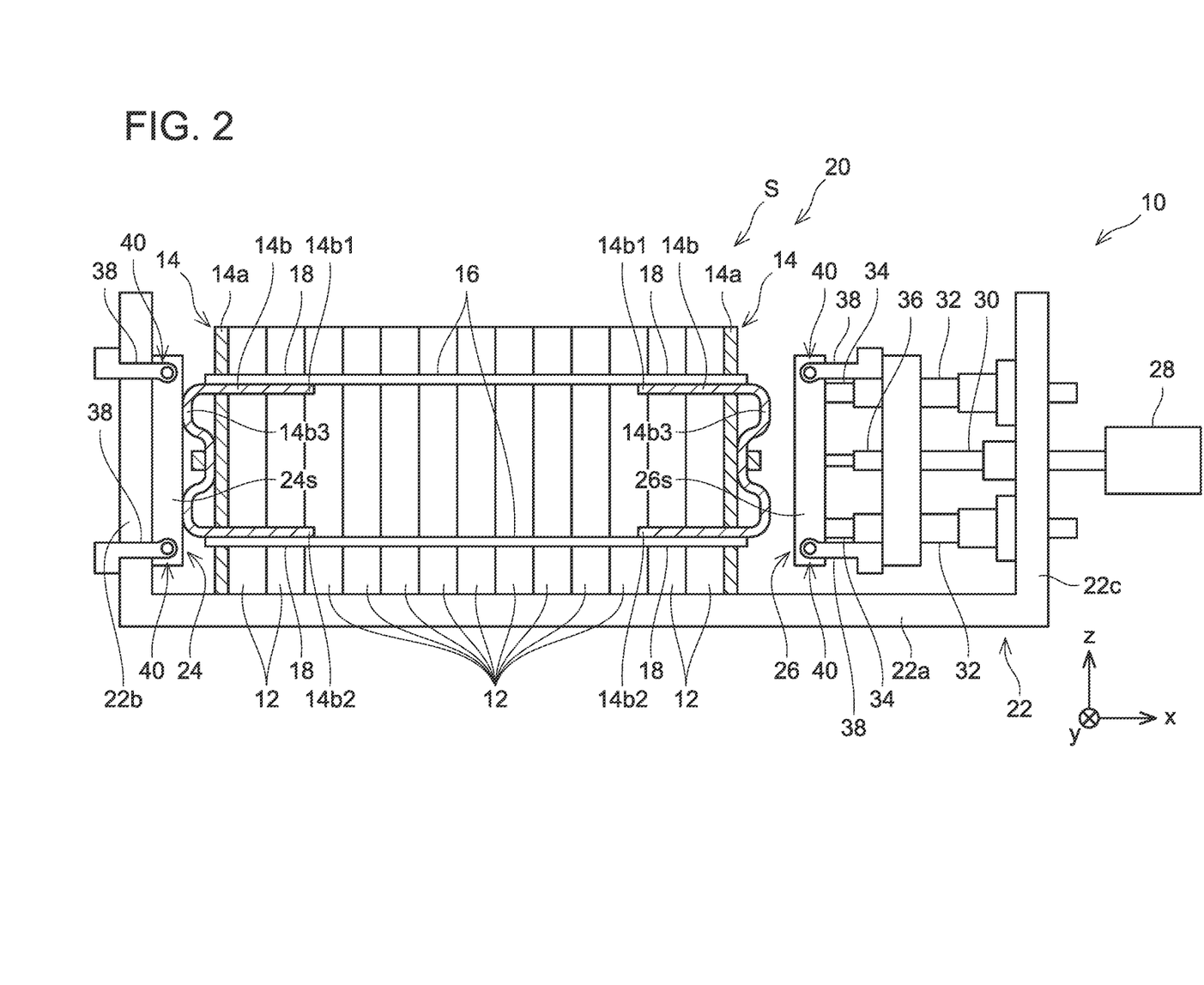
FIG. 2 is a front view schematically illustrating the jig 10 and the battery stack 20, in which the movable block 26 is at a release position and the clamps 38 are at a retracted position.
Figure 3:
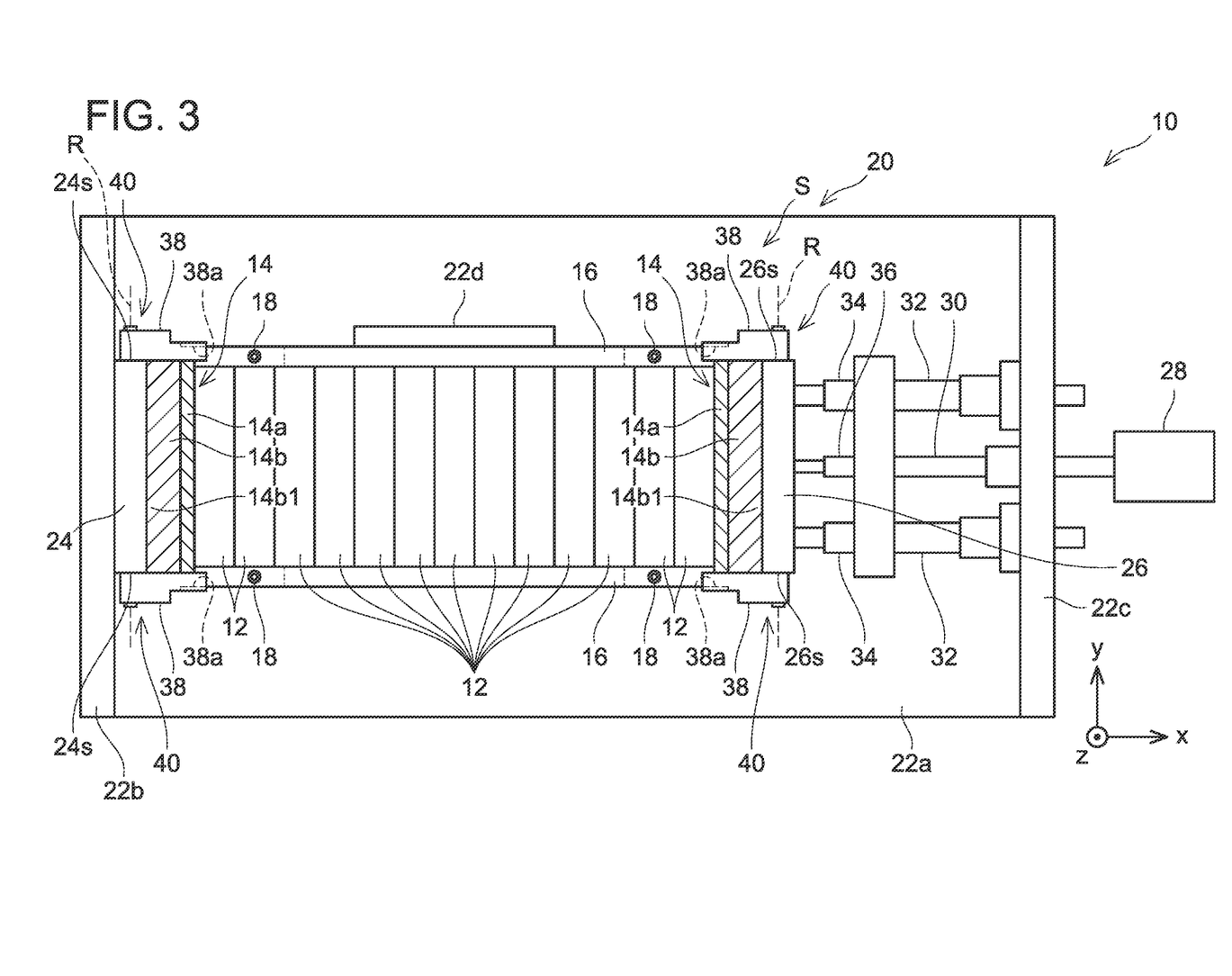
FIG. 3 is a plan view schematically illustrating the jig 10 and the battery stack 20, in which the movable block 26 is at the compression position and the clamps 38 are at the use position.

As illustrated in FIGS. 1 to 3, the battery stack 20 includes a stack S and a plurality of bands 16 that restrain the stack S. The stack S includes a plurality of battery cells 12 and a pair of end plates 14, and the plurality of battery cells 12 are stacked between the pair of end plates 14. A stacking direction of the plurality of battery cells 12 is parallel to the left-right direction (i.e., the x-axis). The pair of end plates 14 are connected to each other by the plurality of bands 16, and hold and compress the plurality of battery cells 12. The jig 10 of the present embodiment is used to position the plurality of bands 16 with respect to the stack S in the manufacture of the battery stack 20. The number of the bands 16 is not particularly limited. As an example, the battery stack according to the present embodiment includes four bands 16.

In the battery stack 20, the plurality of battery cells 12 are connected in series. The battery cells 12 are secondary battery cells, for example, lithium-ion battery cells. However, the battery cells 12 are not limited to lithium-ion battery cells, and may be another type of secondary battery cells such as nickel-metal-hydride battery cells. The number of battery cells 12 is not particularly limited. As an example, the battery stack 20 of the present embodiment includes thirteen battery cells 12 and the rated voltage thereof is 48 volts. The battery stack 20 can be employed in various types of electric-powered vehicles such as an electric vehicle and a fuel cell vehicle.

Each end plate 14 includes a main plate 14a and a bracket 14b. The main plates 14a are generally plate-shaped members. The pair of main plates 14a are arranged perpendicular to the stacking direction and opposed to each other with the plurality of battery cells 12 interposed therebetween. Each bracket 14b is made of a bent plate. The brackets 14b each include upper portions 14b1, lower portions 14b2, and an intermediate portion 14b3 located between the upper portions 14b1 and the lower portions 14b2. The upper portions 14b1 and the lower portions 14b2 extend along the stacking direction. The intermediate portions 14b3 extend along the up-down direction (i.e., the z-axis) and are attached to the corresponding main plates 14a, respectively. In the pair of end plates 14, the upper portions 14b1 of the brackets 14b are connected to each other by the bands 16, and the lower portions 14b2 of the brackets 14b are connected to each other by the other bands 16.

Each of the plurality of bands 16 is a band-shaped elongated member. The plurality of bands 16 are adjacent to the stack S and extend along the stacking direction of the plurality of battery cells 12 (i.e., the left-right direction). Both end portions of each band 16 are joined to the pair of end plates 14, respectively, and more specifically, joined to the pair of brackets 14b by joints 18. The joints 18 are formed by crimping the bands 16 and the brackets 14b.

The jig 10 includes a base 22, a pair of press blocks 24, 26, a plurality of clamps 38, a plurality of hinge mechanisms 40, a plurality of cam mechanisms 42, an electric motor 28, and a linear motion mechanism 30. The base 22 includes a bottom wall 22a, and a left wall 22b and a right wall 22c that erect at opposing ends of the bottom wall 22a. The left wall 22b and the right wall 22c are opposed to each other. The bottom wall 22a is configured such that the stack S can be placed on an upper surface of the bottom wall 22a. In an example, as illustrated in FIG. 3, a positioning wall 22d erects on the bottom wall 22a. The positioning wall 22d is located at a front portion of the bottom wall 22a. The positioning wall 22d extends along the left-right direction. This allows for determination of the position of the stack S in the front-rear direction as the stack S is moved from the rear toward the positioning wall 22d of the base 22.

The pair of press blocks 24, 26 are configured to hold and compress the stack S in the stacking direction. The pair of press blocks 24, 26 include a fixed block 24 and a movable block 26. The fixed block 24 is provided on the left wall 22b of the base 22. The movable block 26 is located near the right wall 22c of the base 22 and is attached to the right wall 22c via a plurality of linear motion guides 32. Thus, the movable block 26 is movable along the left-right direction and is thus movable toward and away from the fixed block 24. The number of the linear motion guides 32 is not particularly limited. As an example, the jig 10 of the present embodiment includes four linear motion guides 32.

The electric motor 28 is connected to the movable block 26 via the linear motion mechanism 30. The linear motion mechanism 30 converts rotational motion of the electric motor 28 to linear motion of the movable block 26. Thus, the electric motor 28 can move the movable block 26 toward and away from the fixed block 24. The movable block 26 is movable between a release position illustrated in FIG. 2 and a compression position illustrated in FIG. 1. When the stack S is to be set with respect to the jig 10, the movable block 26 is located at the release position, and then when the bands 16 are to be assembled to the stack S, the movable block 26 is located at the compression position. Once the movable block 26 is moved to the compression position, the stack S is held and compressed by the pair of press blocks 24, 26. The electric motor 28 is an example of the "actuator" according to the technology disclosed herein.

A plurality of elastic members 34 are provided between the linear motion mechanism 30 and the movable block 26. The movable block 26 is supported by the plurality of elastic members 34. The plurality of elastic members 34 are arranged in parallel with each other. The plurality of elastic members 34 are members with elasticity, such as springs. According to such a configuration, when the movable block 26 contacts the stack S, the movable block 26 can change its orientation to follow the surface of the stack S that the movable block 26 is in contact with, for example, in accordance with dimensional errors of the stack S. As a result, the movable block 26 can contact the stack S over a wide area, and thus a local load on the stack S can be suppressed. In the present embodiment, four elastic members 34 are used, but the number of the elastic members 34 may be two or three, or may be five or more.

A load sensor 36 is provided between the movable block 26 and the linear motion mechanism 30. The load sensor 36 measures a load applied by the movable block 26 to the stack S. Thus, the movement of the movable block 26 can be controlled such that a predetermined load is applied to the stack S. In the present embodiment, a load cell is used as the load sensor 36.

As an example, the position of the movable block 26 is substantially the same as the position of the fixed block 24 in the up-down direction and in the front-rear direction. The fixed block 24 and the movable block 26 may have the same structure. However, the configuration of the pair of press blocks 24, 26 is not particularly limited. The pair of press blocks 24, 26 may have any configuration so long as they are capable of holding and compressing the stack S. The fixed block 24 may be a member separate from the left wall 22b of the base 22 as in the present embodiment, or may be integral with the left wall 22b of the base 22. Alternatively, in another embodiment, the pair of press blocks 24, 26 may both be movable blocks.

Each of the press blocks 24, 26 is provided with a plurality of clamps 38. In an example, the fixed block 24 includes a pair of side surfaces 24s in the front-rear direction, and the clamps 38 are attached to an upper end portion and a lower end portion of each side surface 24s, respectively. Similarly, the movable block 26 includes a pair of side surfaces 26s in the front-rear direction, and the clamps 38 are attached to an upper end portion and a lower end portion of each side surface 26s, respectively. The clamps 38 position the bands 16 with respect to the stack S held by the pair of press blocks 24, 26.

Figure 4A:
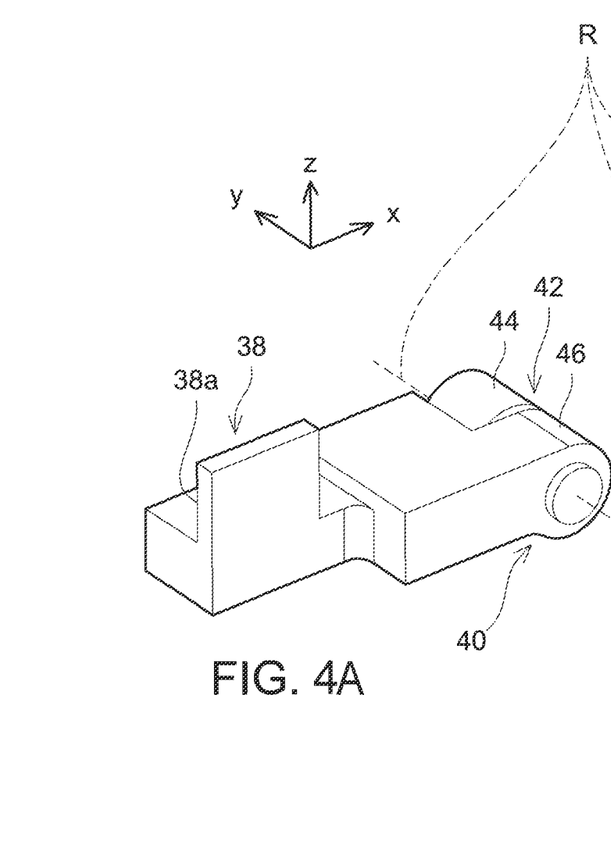
FIG. 4A illustrates a perspective view of the clamp 38, in which the clamp 38 is at the retracted position and a pivot angle of a hinge mechanism 40 is 180 degrees.
Figures 4B, 4C:
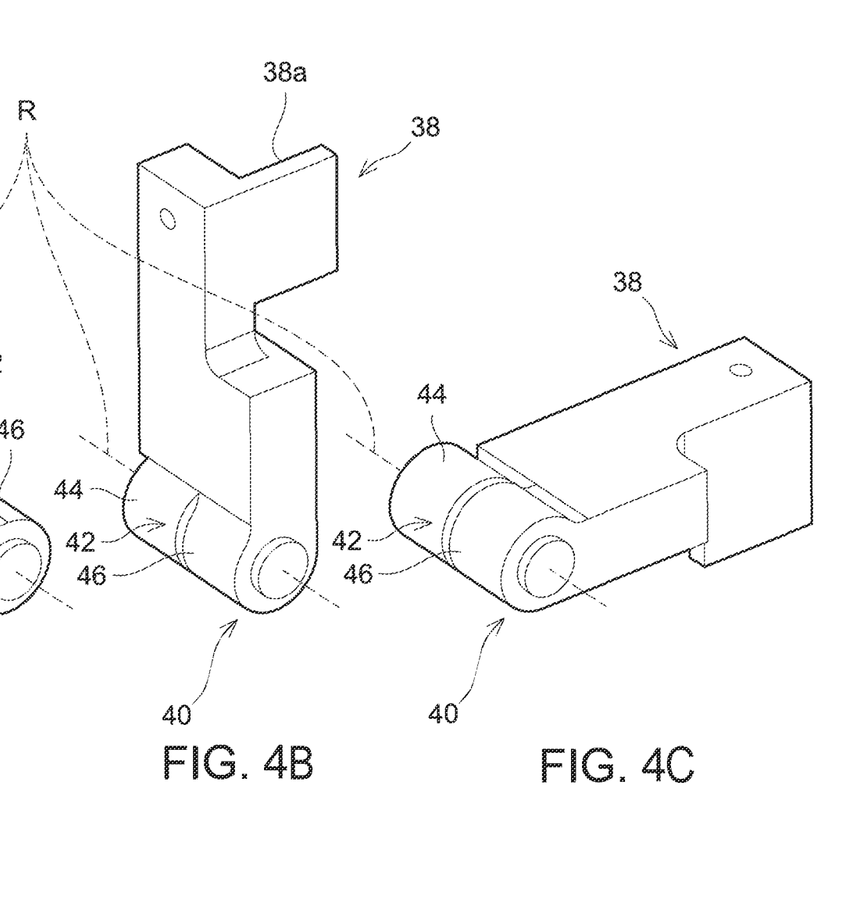
FIG. 4B illustrates a perspective view of the clamp 38, in which the clamp 38 is at the retracted position and the pivot angle of the hinge mechanism 40 is 90 degrees.
FIG. 4C illustrates a perspective view of the clamp 38, in which the clamp 38 is at the use position and the pivot angle of the hinge mechanism 40 is 0 degrees.

Referring to FIGS. 4A to 4C and FIGS. 5A to 5C, the hinge mechanisms 40 and the cam mechanisms 42 will be described. As illustrated in FIGS. 4A to 4C, the hinge mechanisms 40 connect the clamps 38 to corresponding one of the press blocks 24 and 26 such that the clamps 38 are pivotable about a pivot axis R that extends perpendicular to the stacking direction. Thus, each clamp 38 can pivot between a use position illustrated in FIGS. 1 and 3 and a retracted position illustrated in FIG. 2. When the clamps 38 are at the use position, the clamps 38 are in proximity to the stack S and the bands 16 are held between the clamps 38 and the stack S. Thus, the bands 16 are positioned with respect to the stack S. On the other hand, when the clamps 38 are at the retracted position, the clamps 38 are away from the stack S and thus stack S can be set in or removed from the jig 10.

Each clamp 38 includes a contact surface 38a that contacts the band 16 when the clamp 38 is at the use position. When the clamps 38 are at the use position, the contact surfaces 38a are located on the same side as the stack S with respect to the press blocks 24, 26 (see FIG. 1). When the clamps 38 are at the retracted position, the contact surfaces 38a are located on the opposite side to the stack S with respect to the press blocks 24, 26 (see FIG. 2). According to such a configuration, when the stack S is to be placed in the jig 10 and when the stack S is removed from the jig 10, the clamps 38 can be retracted to positions where the clamps 38 do not hinder the placement and removal of the stack S.

Each clamp 38 includes the contact surface 38a at one end thereof and is connected to the hinge mechanism 40 at the other end thereof. According to such a configuration, the contact surfaces 38a of the clamps 38 can be greatly moved by pivot of the clamps 38. Each hinge mechanism 40 is configured to be pivotable in a range from 0 degrees to 180 degrees. Here, when the pivot position of the clamp 38 is the position illustrated in FIG. 4C (use position), the pivot angle of the hinge mechanism 40 is 0 degrees; when the pivot position of the clamp 38 is the position illustrated in FIG. 4B, the pivot angle of the hinge mechanism 40 is 90 degrees; and when the pivot position of the clamp 38 is the position illustrated in FIG. 4A, the pivot angle of the hinge mechanism 40 is 180 degrees. The pivot angle of the hinge mechanisms 40 is not limited to this range and they may be pivotable in a range of 180 degrees or more.

Each hinge mechanism 40 includes a first shaft 44 and a second shaft 46. Each first shaft 44 is fixed to corresponding one of the press blocks 24, 26. Each second shaft 46 is fixed to corresponding one of the clamps 38 and is arranged coaxially with the corresponding first shaft 44 along the pivot axis R. The cam mechanism 42 is provided between the first shaft 44 and the second shaft 46 of each hinge mechanism 40. The cam mechanisms 42 move the clamps 38 along the pivot axis R according to the pivot position of the clamps 38.

The configuration of the cam mechanisms 42 is not particularly limited. As an example, in the present embodiment, each cam mechanism 42 includes a pair of cam protrusions 48a, 48b provided on the hinge mechanism 40 and a biasing member 50 that biases one of the pair of cam protrusions 48a, 48b toward the other. The pair of cam protrusions 48a, 48b include a first cam protrusion 48a provided on the first shaft 44 and a second cam protrusion 48b provided on the second shaft 46. The first cam protrusion 48a protrudes from the first shaft 44 toward the second shaft 46 in a direction parallel to the pivot axis R, and the second cam protrusion 48b protrudes from the second shaft 46 toward the first shaft 44 in a direction parallel to the pivot axis R. The biasing member 50 is provided at the second shaft 46. However, the number and the position of the biasing member 50 are not particularly limited, so long as it is provided at least one of the first shaft 44 and the second shaft 46.

Figure 5A:
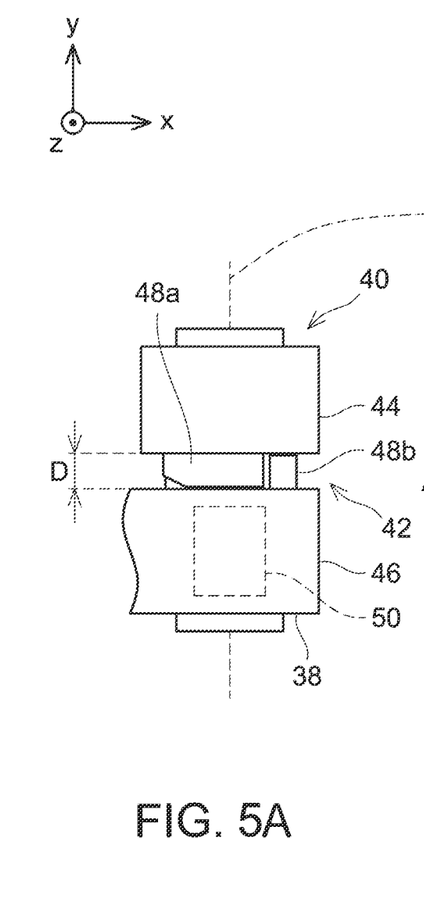
FIG. 5A illustrates a cam mechanism 42 provided at the hinge mechanism 40 in a plan view perpendicular to a pivot axis R of the hinge mechanism 40.
Figure 5B:
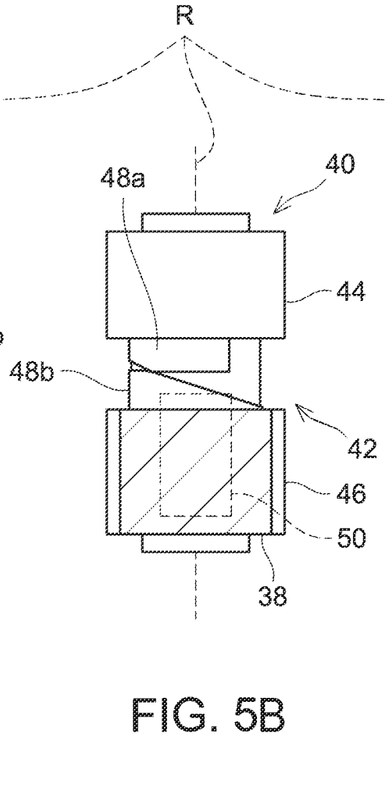
FIG. 5B illustrates the cam mechanism 42 provided at the hinge mechanism 40 in the plan view perpendicular to the pivot axis R of the hinge mechanism 40.
Figure 5C:
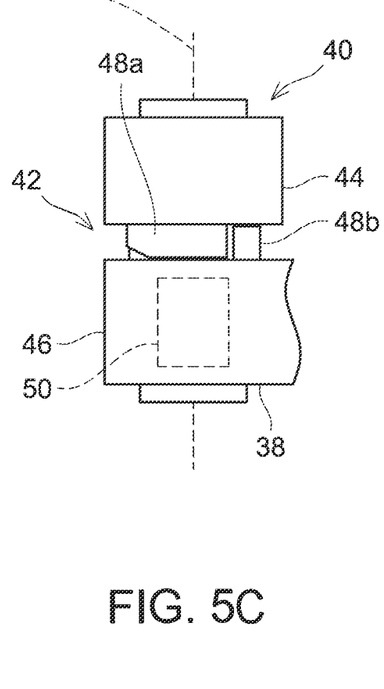
FIG. 5C illustrates the cam mechanism 42 provided at the hinge mechanism 40 in the plan view perpendicular to the pivot axis R of the hinge mechanism 40.
Figure 6:
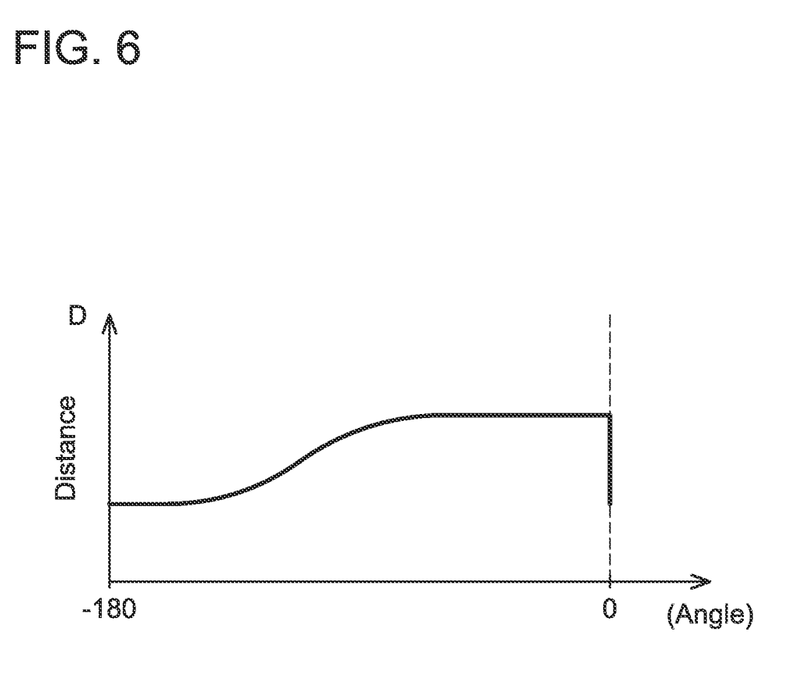
FIG. 6 is a graph for a distance D between a first shaft 44 and a second shaft 46 that are moved in accordance with the pivot position of the clamp 38.

As illustrated in FIG. 5A, when the clamp 38 is at the retracted position, the pair of cam protrusions 48a, 48b are spaced apart from each other. At this time, a distance D between the first shaft 44 and the second shaft 46 is relatively small. On the other hand, as illustrated in FIG. 5B, while the clamp 38 is moving from the retracted position to the use position, the pair of cam protrusions 48a, 48b contact each other, so that the distance D between the first shaft 44 and the second shaft 46 is increased. As a result, the clamp 38 is moved in a direction away from the stack S, and thus contact of the clamp 38 with the band 16 can be avoided. Thereafter, as illustrated in FIG. 5C, once the clamp 38 moves up to the use position, the pair of cam protrusions 48a, 48b have completely passed each other, so that the distance D between the first shaft 44 and the second shaft 46 is rapidly reduced. As a result, the clamp 38 is promptly moved toward the stack S along the pivot axis R and holds the band 16 between itself and the stack S. That is, as illustrated in FIG. 6, the distance D between the first shaft 44 and the second shaft 46 changes according to the pivot position of the clamp 38 (the pivot angle of the hinge mechanism 40) and the clamp 38 is moved along the pivot axis R according to the change.

Referring to FIGS. 7 to 10, a method of manufacturing the battery stack 20 using the jig will be described. First, the stack S in which the plurality of battery cells 12 are stacked between the pair of end plates 14 is prepared. The manufacturing method according to this embodiment is, in particular, a method of positioning the plurality of bands 16 with respect to the prepared stack S and joining the bands 16 to the pair of end plates 14.

Figure 7:
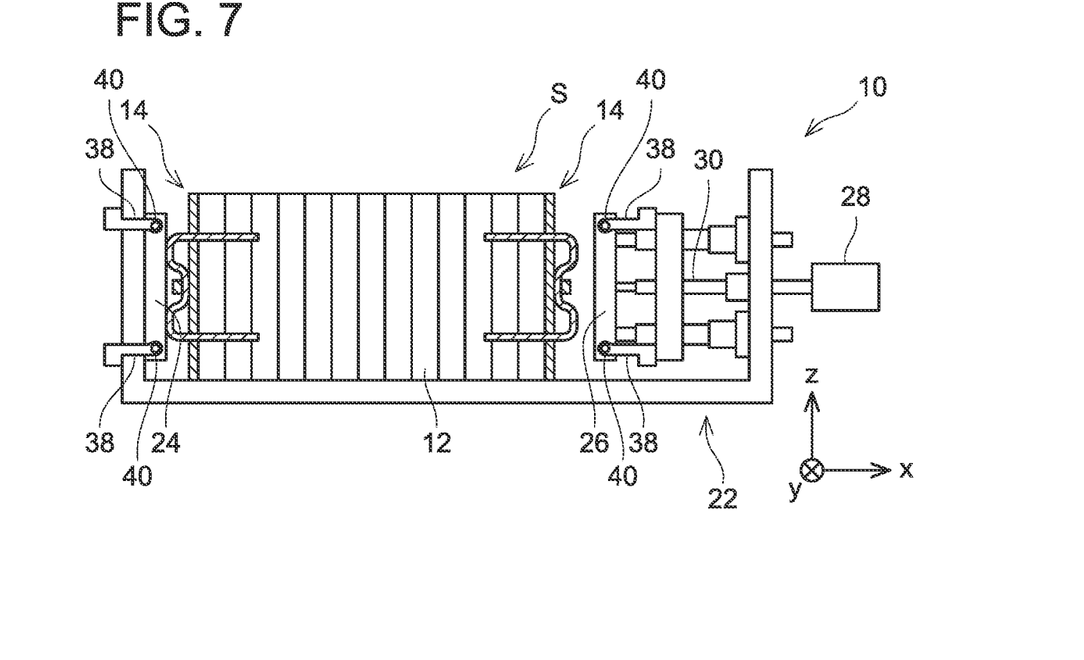
FIG. 7 illustrates a step of setting a stack S to the jig 10.

As illustrated in FIG. 7, the stack S is set in the jig 10. At this time, the movable block 26 is located at the release position and the clamps 38 are located at the retracted position. The stack S is set such that the stacking direction of the stack S coincides with the left-right direction. The stack S is slid on the base 22 from the rear toward the front to bring a side surface of the stack S into contact with the positioning wall 12d illustrated in FIG. 3, so that the stack S is positioned at a predetermined position on the base 22.

Figure 8:
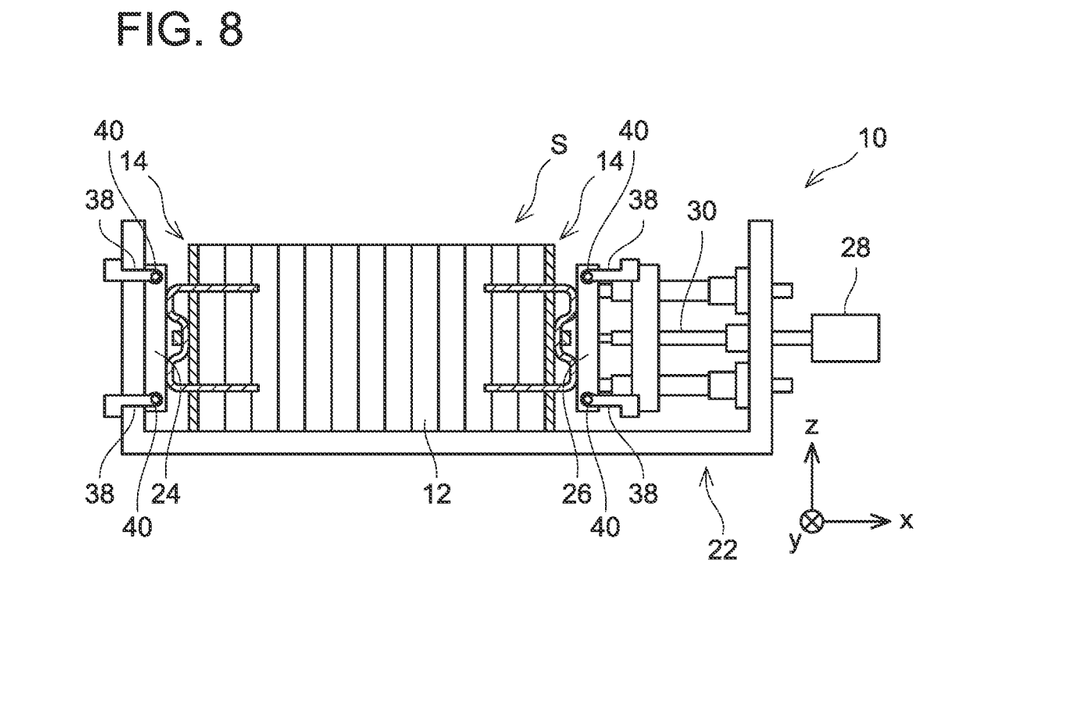
FIG. 8 illustrates a step of pressing the stack S.

Next, as illustrated in FIG. 8, the stack S is pressed by the jig 10. Specifically, the movable block 26 is moved from the release position to the compression position. The stack S is thereby held and compressed by the pair of press blocks 24, 26.

Figure 9:
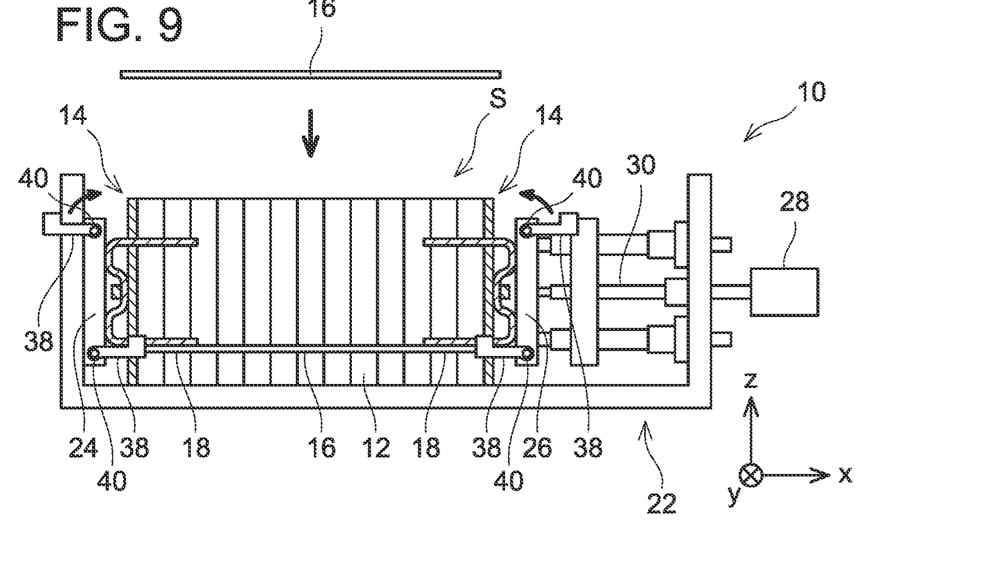
FIG. 9 illustrates a step of attaching and positioning a band 16 with respect to the stack S.

Next, as illustrated in FIG. 9, each of the plurality of bands 16 is arranged with respect to the stack S by the jig 10. The bands 16 are arranged on the brackets 14b of the pair of end plates 14. After the bands 16 have been arranged, the clamps 38 are pivoted from the retracted position to the use position. Once the clamps 38 reach the use position, the bands 16 are interposed between the clamps 38 and the stack S. Thus, the bands 16 are positioned with respect to the stack S.

Figure 10:
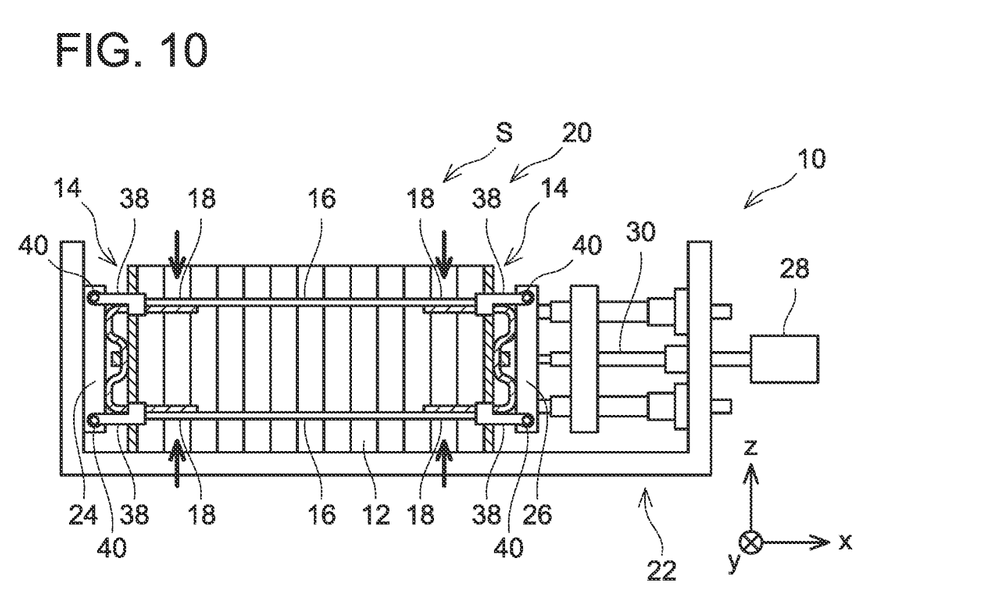
FIG. 10 illustrates a step of joining the band 16 to the pair of end plates 14.

Then, as illustrated in FIG. 10, the bands 16 are connected to the pair of end plates 14. Specifically, the bands 16 are connected to the brackets 14b of the end plates 14 by the joints 18. Each joint 18 is formed by crimping an overlapping of two plate members 14, 16, such as the band 16 and the bracket 14b. At this time, since the bands 16 are fixed with respect to the stack S by the clamps 38 in the previous step of positioning the bands 16, unintended displacement of the bands 16 is suppressed. Therefore, the bands 16 can be joined with sufficient strength.

In the way described above, the battery stack 20 in which the bands 16 are accurately positioned with respect to the stack S is completed. When the battery stack 20 is to be removed from the jig 10, the clamps 38 are pivoted from the use position (the pivot position of the clamps 38 in FIG. 1) to the retracted position (the pivot position of the clamps 38 in FIG. 2) and then the movable block 26 is moved from the compression position (the position of the movable block 26 in FIG. 1) to the release position (the position of the movable block 26 in FIG. 2).

In the manufacture of the battery stack 20, as described above, the stack S in which the plurality of battery cells 12 are stacked between the pair of end plates 14 is prepared. Next, the bands 16 are positioned with respect to the stack S while the stack S is compressed under a predetermined load, and the bands 16 and the end plates 14 are joined to each other. Thus, the pair of end plates 14 are connected to each other via the bands 16. If the bands 16 are displaced when the bands 16 and the end plates 14 are joined to each other, they may not be joined with sufficient strength.

In order to solve the above problem, in the jig 10 of the present embodiment, the stack S including the pair of end plates 14 and the plurality of battery cells 12 is held and compressed by the pair of press blocks 24, 26. Each of the press blocks 24, 26 is provided with the plurality of clamps 38 that position the bands arranged along the stack S with respect to the stack S. Each clamp 38 is connected to corresponding one of the press blocks 24, 26 via the hinge mechanism and is configured to be pivotable between the use position and the retracted position. When the clamps 38 pivot from the retracted position to the use position, the bands 16 are interposed between the clamps 38 and the stack S in the direction parallel to the pivot axis R of the hinge mechanisms 40. Thus, the bands 16 are positioned with respect to the stack S.

Further, each hinge mechanism 40 is provided with the cam mechanism 42. The cam mechanisms 42 move the clamps 38 along the pivot axis R according to the pivot position of the clamps 38. While moving from the retracted position to the use position, each clamp 38 is moved by its corresponding cam mechanism 42 in a direction away from the stack S, and once reaching the use position, each clamp 38 is moved by its corresponding cam mechanism 42 toward the stack S. Thus, while the clamps 38 are pivoting toward the use position, the clamps 38 do not contact the bands 16 unnecessarily, and thus unintended displacement of the bands 16 is avoided. Further, once the clamps 38 reach the use position, the clamps 38 are moved toward the stack S, so that the bands 16 are interposed between the clamps 38 and the stack S. At this time, since the clamps 38 are moved along the pivot axis R of the hinge mechanisms 40, unintended displacement of the bands 16 is suppressed even when the clamps 38 contact the bands 16.

What is claimed is:

1. A jig for positioning a band that connects a pair of end plates to each other with respect to a stack in which a plurality of battery cells are stacked between the pair of end plates, the jig comprising:
   a pair of press blocks configured to hold and compress the stack along a stacking direction of the stack;
   a clamp provided on at least one press block of the pair of press blocks, wherein the clamp is configured to position the band arranged along the stack held by the pair of press blocks with respect to the stack;
   a hinge mechanism connecting the clamp to the at least one press block such that the clamp is pivotable between a use position and a retracted position about a pivot axis perpendicular to the stacking direction; and
   a cam mechanism provided on the hinge mechanism and configured to move the clamp along the pivot axis according to a pivot position of the clamp,
   wherein
   when the clamp is at the use position, the band is interposed between the clamp and the stack in a direction parallel to the pivot axis, and
   the cam mechanism moves the clamp along the pivot axis in a direction away from the stack while the clamp is pivoting from the retracted position to the use position and moves the clamp along the pivot axis toward the stack when the clamp reaches the use position.

2. The jig according to claim 1, wherein
   the clamp comprises a contact surface that contacts the band at the use position,
   the contact surface is located on a same side as the stack with respect to the at least one press block when the clamp is at the use position, and
   the contact surface is located on an opposite side to the stack with respect to the at least one press block when the clamp is at the retracted position.

3. The jig according to claim 2, wherein the clamp comprises the contact surface at one end thereof and is connected to the hinge mechanism at another end thereof.

4. The jig according to claim 1, wherein the cam mechanism comprises:
   a pair of cam protrusions provided on the hinge mechanism, and
   a biasing member biasing the clamp along the pivot axis.

5. The jig according to claim 4, wherein
   the hinge mechanism comprises:
   a first shaft fixed on the at least one press block; and
   a second shaft fixed on the clamp and arranged coaxially with the first shaft along the pivot axis,
   the pair of cam protrusions are located between the first shaft and the second shaft, and
   the biasing member is provided on one of the first shaft and the second shaft.

6. The jig according to claim 1, further comprising an actuator configured to advance and retract one of the pair of press blocks toward and away from the other of the pair of press blocks or advance and retract both of the pair of press blocks toward and from each other.

7. The jig according to claim 1, wherein
   the at least one press block is supported by a plurality of elastic members arranged in parallel with each other such that when the at least one press block contacts the stack, the at least one press block changes its orientation to follow a surface of the stack that the at least one press block is in contact with.

8. The jig according to claim 1, further comprising a positioning member configured to position the stack by contacting the stack located between the pair of press blocks in a direction perpendicular to the stacking direction.

* * * * *